(12) United States Patent
Polesel Maris et al.

(10) Patent No.: US 10,626,296 B2
(45) Date of Patent: Apr. 21, 2020

(54) ANTI-ADHESIVE COATINGS BASED ON CONDENSED TANNINS

(71) Applicant: SEB S.A., Ecully (FR)

(72) Inventors: Jérôme Polesel Maris, Mexy (FR); Isabelle Joutang, La Motte Servolex (FR)

(73) Assignee: SEB S.A., Ecully (FR)

( * ) Notice: Subject to any disclaimer, the term of this patent is extended or adjusted under 35 U.S.C. 154(b) by 0 days.

(21) Appl. No.: 15/755,181

(22) PCT Filed: Sep. 2, 2016

(86) PCT No.: PCT/FR2016/052170
§ 371 (c)(1),
(2) Date: Feb. 26, 2018

(87) PCT Pub. No.: WO2017/037393
PCT Pub. Date: Mar. 9, 2017

(65) Prior Publication Data
US 2018/0244954 A1    Aug. 30, 2018

(30) Foreign Application Priority Data

Sep. 2, 2015 (FR) .................................... 15 58122

(51) Int. Cl.

| | | |
|---|---|---|
| *C09D 199/00* | (2006.01) | |
| *C09D 127/12* | (2006.01) | |
| *C09D 5/08* | (2006.01) | |
| *C08L 99/00* | (2006.01) | |
| *C09D 5/00* | (2006.01) | |
| *C09D 5/02* | (2006.01) | |
| *B05D 1/02* | (2006.01) | |
| *B05D 3/02* | (2006.01) | |
| *B05D 5/08* | (2006.01) | |
| *B05D 7/14* | (2006.01) | |
| *B05D 7/00* | (2006.01) | |
| *C09D 127/18* | (2006.01) | |

(52) U.S. Cl.
CPC ............. *C09D 199/00* (2013.01); *B05D 1/02* (2013.01); *B05D 3/0254* (2013.01); *B05D 5/08* (2013.01); *B05D 7/14* (2013.01); *B05D 7/544* (2013.01); *C08L 99/00* (2013.01); *C09D 5/00* (2013.01); *C09D 5/02* (2013.01); *C09D 127/12* (2013.01); *C09D 127/18* (2013.01); *B05D 5/083* (2013.01)

(58) Field of Classification Search
CPC ................ C09D 5/1662; C09D 5/1668; C09D 127/12–127/20
USPC .................................................. 428/421, 422
See application file for complete search history.

(56) References Cited

U.S. PATENT DOCUMENTS

| | | |
|---|---|---|
| 3,975,214 A | 8/1976 | Kulick et al. |
| 4,180,406 A | 12/1979 | Miyazaki et al. |
| 4,948,513 A | 8/1990 | Mitchell et al. |
| 2014/0023879 A1* | 1/2014 | Shibao ..................... C09D 5/08 428/612 |

FOREIGN PATENT DOCUMENTS

| | | |
|---|---|---|
| WO | 90/05794 A1 | 5/1990 |
| WO | 2011/006065 A2 | 1/2011 |

OTHER PUBLICATIONS

G. Tondi et al., Tannin-based carbon forms, Carbon, 2009, 1480-1492, 47, Elsevier Ltd.
Natalia Bellotti et al., Quarternary Ammonium "Tannate" for Antifouling Coatings, Industrial & Engineering Chemistry Research, 2012, 16626-16632, 51, ACS Publications.
Tadas S. Sileika et al., Colorless Multifunctional Coatings Inspired by Polyphenols Found in Tea, Chocolate, and Wine, Angewante Chemie International Edition, 2013, 10766-10770, 52, Wiley-VCH Verlag GmbH & Co.

* cited by examiner

*Primary Examiner* — Ramsey Zacharia
(74) *Attorney, Agent, or Firm* — The Webb Law Firm (57) ABSTRACT

The invention relates to a composition for coatings which includes at least one condensed tannin and water and which has a pH of more than 7. The invention also relates to an anti-adhesive coating composition including said type of composition for coatings.

12 Claims, 3 Drawing Sheets

ANTI-ADHESIVE COATINGS BASED ON CONDENSED TANNINS

CROSS-REFERENCE TO RELATED APPLICATIONS

This application is the United States national phase of International Application No. PCT/FR2016/052170 filed Sep. 2, 2016, and claims priority to French Patent Application No. 1558122 filed Sep. 2, 2015, the disclosures of which are hereby incorporated in their entirety by reference.

FIELD OF THE INVENTION

The present invention generally pertains to coating compositions (or semi-finish compositions) as well as anti-adhesive coating compositions (or primer compositions, or intermediate or midcoat layer compositions, or finish compositions) comprising such coating compositions.

The invention belongs to the field of semi-finish, primer, midcoat and finish formulations for anti-adhesive coatings to be applied onto heating items, and in particular, culinary items or household appliances, and to the field of such anti-adhesive coatings.

BACKGROUND OF THE INVENTION

Examples of culinary items used in the context of the present invention include frying pans, sauté pans, pots, woks, crepe pans, Dutch ovens, kettles, casseroles, roasters and grill pans.

Examples of household appliances used in the context of the present invention include deep fryers, skillets or pots for fondue or raclette, and clothing iron soleplates.

Individuals of ordinary skill in the art will know that culinary items must satisfy certain performance criteria in terms of their anti-adhesive properties, scratch resistance and, more generally, their resistance to the various stresses to which they are subjected during use.

Fluoropolymer-based coatings provide the optimal compromise for all these properties. However, some difficulty remains with respect to the adherence of these coatings on the support of the item and numerous solutions have been proposed.

A significant number of the formulations designed to improve the adhesion of polytetrafluoroethylene (PTFE) are achieved using an adhesion co-resin. Heterocyclic polymers, such as polyamide-imides (PAI) and polyimides (PI) are among the most frequently used resins. For use in combination with colloidal dispersions of PTFE, these adhesion co-resins must necessarily be previously dispersed in an aqueous phase.

The starting material is a heterocyclic polymer resin in solution in a polar aprotic solvent such as N-ethylpyrrolidone (NEP) or N-methylpyrrolidone (NMP). Next, salification of the acid groups is achieved via the addition of very basic primary or secondary amines, and then water is introduced into the mixture to effect the phase inversion of the mixture.

It should be noted that most polar aprotic solvents are subject to labeling as a hazardous or even toxic material under the REACH regulation (European Union Regulation concerning the registration, evaluation and authorization of chemical substances as well as the restrictions applicable to these substances). Accordingly, the environmental and health impacts associated with the use of such substances are non-negligible.

Furthermore, the use of salification amines results in the opening of the imide rings of the heterocyclic polymer and accordingly, film formation is often of a lower quality than desired, and the adhesion and/or corrosion-resistance of the obtained coating is weakened. Finally, the use of salification amines, regardless of their type, accentuates yellowing in the development of the coating.

Recently, it has come to light that certain polyphenols found in certain plants and foods (in particular green tea, red wine and cocoa) make it possible to achieve polymerized products that can adhere to different surfaces (Tadas S Sileika et al., "Colorless Multifunctional Coatings Inspired by Polyphenols Found in Tea, Chocolate, and Wine," Angewandte Chemie International Edition 52(41), 10766-10770 (2013)). Hydrolysable tannins (tannic acid, gallic acid, pyrogallol, epigallocatechin gallate, etc.) present in these food compounds have a chemical structure conducive to adhesion via a chemical reaction of dehydration or chelation with metals or inorganic surfaces.

These polymerized hydrolysable tannins, however, exhibit a rather low thermal resistance that is not compatible with use at high temperatures such as those required, for example, by a culinary item.

Interestingly, it has also come to light that condensed tannins can be used to generate foams that are resistant to high temperatures (greater than 1400° C.) and to the flame of a torch (G. Tondi et al., "Tannin-based carbon foams," Carbon 47 (2009) 1480-1492).

These tannins are obtained from plants (wood, bark, marc) after simple extraction with water. Condensed tannins thus represent a very interesting resource channel for "green" (i.e. biosourced) primary materials as an alternative to petroleum derivative chemical products.

SUMMARY OF THE INVENTION

To address the disadvantages of prior art, the applicant has developed semi-finish, primer, intermediate and finish layer compositions to obtain coatings with very low environmental impact while exhibiting excellent resistance to high temperatures, abrasion and corrosion, as well as very good anti-adhesive properties. Furthermore, the semi-finish, primary, intermediate and finish layer compositions according to the present invention exhibit excellent wetting properties and thus spreadability over the support onto which they are deposited.

DESCRIPTION OF THE INVENTION

In particular, the present invention pertains to a coating composition (or semi-finish composition) comprising at least one condensed tannin and water, and having a pH greater than 7.

The water in the coating composition acts as a protic solvent by solubilizing the tannins. This solubilization is necessary to allow the polymerization of the condensed tannins.

Advantageously, the mass percent of water in the coating composition may range between 50% and 95%, preferably between 60% and 90%, and ideally between 80% and 90% of the total mass of water and condensed tannin.

In the context of the present invention, the term "condensed tannins" signifies non-hydrolyzable tannins.

Advantageously, the condensed tannin or tannins that can be used in the coating composition according to the present invention may have, as a base structure, one or more flavan-3-ol monomer (catechin) and/or flavan-3,4-diol (leucoanthocyanidin) monomer units and/or phlorotannins.

Advantageously, the condensed tannin or tannins that can be used in the coating composition according to the present invention may have, as a base structure, one or more monomer units corresponding to the following formula:

in which the carbons in position 6, 8, 2' and 6' are substituted by a hydrogen, the carbons in position 4, 5, 3' and 5' are independently substituted by a hydroxyl group or by a hydrogen.

For example, the condensed tannin or tannins that can be used in the coating composition according to the present invention may have as their base structure one or more monomer units corresponding to one of formulas (I) through (VI) as follows:

I

II

III

IV

V

VI

The condensed tannins that can be used in the coating composition according to the invention may, for example, be derived from the plant kingdom (biosourced), and may be, for example, selected from mimosa-derived tannins (particularly those derived from mimosa wood and/or bark), quebracho-derived tannins (particularly those derived from quebracho wood and/or bark), tannins derived from grape marc, tannins derived from the chestnut tree (particularly those derived from chestnut wood and/or bark), and tannins derived from pine (particularly those derived from pine wood and/or bark), tannins derived from brown algae and mixtures thereof.

The condensed tannins that can be used in the coating composition according to the invention may advantageously be synthetic, and may, for example, be selected from the synthetic oligo-proanthocyanidins (OPC) as described in Chapter 4 of S. Quideau et al., "*Plant Polyphenols: Chemical Properties, Biological Activities, and Synthesis*," Angewandte Chemie International Edition 50(3), pp 586-621 (2011).

The condensed tannins that can be used in the coating composition according to the invention may advantageously be a mixture of biosourced condensed tannins and synthetic condensed tannins, as described above.

The condensed tannins may be used, in the coating composition according to the invention, alone or in a mixture with hydrolysable tannins. Advantageously, hydrolysable tannins ensure good spreadability as well as good cohesion of the coating composition during the film formation.

In the context of the present invention, the term "hydrolysable tannins" signifies any tannin that does not satisfy the definition for "condensed tannins" as specified above, and specifically signifies compounds comprising monomers, such as gallic acid, pyrogallol and also catecholamines (e.g. dopamine) linked by a carbohydrate, typically glucose.

The hydrolysable tannins the can be used in the coating composition according to the invention can advantageously be selected from tannic acid, epigallocatechin gallate (EGCG), epicatechin gallate (ECG) and epigallocatechin (EGC).

Advantageously, condensed tannins, alone or in a mixture with hydrolysable tannins, that can be used in the coating composition according to the invention, may be in powder form.

Where condensed tannins are used alone, the tannin powder may advantageously be purified of hydrolysable tannins and/or sugars.

Where condensed tannins are used in a mixture with hydrolysable tannins, the tannin powder may advantageously be purified of sugars.

The coating composition must have a basic pH to trigger the polymerization of the condensed tannins.

Advantageously, the pH of the coating composition according to the invention may be between 8 and 13, and preferably between 10 and 12.

Advantageously, the coating composition may further comprise at least one polymerization agent. Advantageously, the addition of a polymerization agent promotes the polymerization of the tannins.

Advantageously, the mass percent of the polymerization agent, in the coating composition according to the invention, may be greater than 0% and less than 50% of the total mass of the polymerization agent and the condensed tannin.

Preferably, the mass percent of the polymerization agent, in the coating composition according to the invention, may be between 5% and 50%, and preferably between 20% and 50%, relative to the total mass of the polymerization agent and the condensed tannin.

The polymerization agent may, for example, be selected from furfuryl alcohol, glyoxal, phosphate derivatives, and mixtures thereof. Phosphate derivatives may advantageously be selected from alkyl phosphates and phenyl phosphates, and preferably from trialkyl phosphates such as triethylphosphate. Advantageously, the glyoxal and phosphate derivatives further improve, in particular, the thermal resistance of the coating, and the furfuryl alcohol further improves the spreadability of the compositions, and thus, the cohesion of the obtained coating.

Advantageously, the coating composition may further comprise at least one solvent.

The solvent may be protic. Advantageously, the protic solvent may function as a radical inhibitor and thus prolong the pot life of the composition by slowing the generation of tannin oligomers.

Advantageously, the solvent may be non-toxic.

The solvent that can be used for the coating composition may advantageously comprise at least one alcohol, and may preferably be selected from isopropanol, methanol, ethanol and mixtures thereof.

Advantageously, the coating composition comprises at most 10% solvent by mass, and preferably at most 9% solvent by mass, relative to the total mass of the coating composition.

The present invention also pertains to an anti-adhesive coating composition (or primer composition or intermediate layer composition or finish composition), comprising:

a coating composition as defined above; and at least one fluorocarbon resin.

The fluorocarbon resin or resins may have the form of a powder or aqueous dispersion.

Advantageously, the fluorocarbon resin or resins may be selected from the group comprising polytetrafluoroethylene (PTFE), tetrafluoroethylene/perfluoropropylvinylether copolymers (PFA), tetrafluoroethylene/hexafluoropropylene copolymers (FEP), polyvinylidene fluoride (PVDF), tetrafluoroethylene/polymethylvinylether copolymers (MVA), terpolymers of tetrafluoroethylene, polymethylvinylether and fluoroalkylvinylether (TFE/PMVE/FAVE), ethylene tetrafluoroethylene (ETFE), and mixtures thereof.

Advantageously, the fluorocarbon resin or resins may be selected from polytetrafluoroethylene (PTFE), tetrafluoroethylene/perfluoropropylvinylether copolymers (PFA), tetrafluoroethylene/hexafluoropropylene copolymers (FEP), a mixture of PTFE and PFA (PTFE/PFA), and a mixture of PTFE and FEP (PTFE/FEP).

Preferably, the fluorocarbon resin or resins may constitute 10% to 99% by weight, preferably from 50% to 98% by weight, of the total dry weight of the anti-adhesive coating composition.

Advantageously, the mass percent of fluorocarbon resin in the anti-adhesive coating composition according to the invention may be between 10% and 99% relative to the total weight of fluorocarbon resin and condensed tannin. In the case of an anti-adhesive primer coating composition, the mass percent of fluorocarbon resin in the anti-adhesive coating composition according to the invention may preferably be between 30% and 60% of the total weight of fluorocarbon resin and condensed tannin. In the case of an intermediate anti-adhesive coating layer, the mass percent of fluorocarbon resin in the anti-adhesive coating composition according to the invention may preferably be between 50% and 95% relative to the total weight of the fluorocarbon resin and condensed tannin. In the case of an anti-adhesive finish coating composition, the mass percent of fluorocarbon resin in the anti-adhesive coating composition according to the invention may preferably be between 98% and 99% relative to the total weight of the fluorocarbon resin and condensed tannin.

Preferably, the mass percent of water in the anti-adhesive coating composition according to the invention is between 50% and 99.5%, preferably between 70% and 99.5% relative to the total weight of water and condensed tannin.

Advantageously, the anti-adhesive coating composition may further comprise at least one solvent.

Advantageously, the solvent may be protic.

Advantageously, the solvent may be non-toxic.

The solvent that can be used in the anti-adhesive coating composition may advantageously comprise at least one alcohol, and may be selected preferably from isopropanol, methanol, ethanol and mixtures thereof.

Advantageously, the anti-adhesive coating composition comprises at most 10% by weight, and preferably at most 9% by weight, solvent relative to the total weight of the coating composition.

The anti-adhesive coating composition may further comprise any suitable additives known to individuals of ordinary skill in the art such as thickeners, wetting agents, surfactants, fillers, pigments and anisotropic particles.

Wetting agents that can be used in the anti-adhesive coating composition according to the invention may, for example, comprise polyethylene glycol, glycerol, or ethylene glycol.

Micronic or submicronic fillers that can be used, in the form of a powder or dispersion, in the anti-adhesive coating composition according to the invention to improve the scratch resistance and peel strength of the coating may, for example, comprise $SiO_2$, $Al_2O_3$, $TiO_2$, SiC, diamond, boron nitride, and earth oxides, such as $CeO_2$.

Among the pigments that can be used in the context of the present invention, particular note may be made of organic or inorganic thermostable pigments, metal salts, thermochromic semiconductor pigments, and mixtures thereof. The pigments may be selected independently from titanium dioxide, spinels, iron oxides, perylene red, dioxazine violet, mixed oxides of aluminum and cobalt, carbon black, chromium oxides and copper oxides.

The anisotropic particles that can be used in the context of the present invention are particles whose characteristic dimensions are not identical in all directions, such as, for example, fibers (of a substantially one-dimensional shape) or flakes (of a substantially two-dimensional or flat shape). Flakes that can be used in the context of the present invention may be independently selected from mica flakes, whether coated or not, silica flakes, coated or not, aluminum flakes, coated or not, iron oxide flakes, coated or not, and mica or silica flakes coated with titanium dioxide. The flakes that can be used in the context of the present invention may be treated to produce a particular color effect.

The anisotropic particles that can be used in the context of the present invention may, for example, be magnetizable or electrifiable. In the context of the present invention, the magnetizable may advantageously be particles comprising at least one ferromagnetic metal. These magnetizable particles may be of a homogenous nature, or in other words, made of a single material, or they maybe be of a composite nature, or in other words, these magnetizable particles have a core-envelope structure, in which the ferromagnetic metal is located in the core and/or the envelope of said particles. Among the examples of composite magnetizable particles, particular note may be made of mica flakes coated in iron oxide $Fe_2O_3$, or stainless steel fibers coated in a sol-gel material, as a means of protection against corrosion while the coating is implemented, or even flakes made of a plastic material coated in iron oxide $Fe_2O_3$, or flakes whose core is made of a ferromagnetic metal and whose envelope is made of a plastic or sol-gel material.

The present invention also pertains to a coating comprising at least one layer of the coating composition as defined above and/or at least one layer of the anti-adhesive coating composition as defined above.

The coating according to the invention may, for example, comprise a layer of a coating composition as defined above, intended to come into contact with the surface of a support onto which the coating is applied. This layer is thus commonly known as a "primer layer." Advantageously, this primer layer according to the invention makes it possible to obtain excellent adhesion of the coating onto the support.

The coating according to the invention may, for example, comprise a coating composition layer as defined above, intended to come into contact with the exterior environment. This layer is thus commonly known as a "finish layer." Advantageously, this finish layer makes it possible to obtain a coating whose surface exhibits excellent anti-adhesive properties, particularly with respect to cooked foods. Furthermore, if the coating comprises multiple layers, this finish layer makes it possible to obtain a very good cohesion of the coating.

The coating according to the invention may, for example, comprise a coating composition layer as defined above, intended to be deposited between a primer layer and a finish layer. This layer is thus commonly known as an "intermediate layer."

Advantageously, layers of compositions based on condensed tannins according to the invention may be combined with layers of conventional fluorinated coating layers.

Thus, the coating according to the present invention may further comprise at least one layer of a composition comprising at least one fluorocarbon resin, possibly mixed with a thermostable binder resin resistant to temperatures greater than 200° C.

The fluorocarbon resin or resins may advantageously be selected from polytetrafluoroethylene (PTFE), tetrafluoroethylene/perfluoropropylvinylether copolymers (PFA), tetrafluoroethylene/hexafluoropropylene copolymers (FEP), polyvinylidene fluoride (PVDF), tetrafluoroethylene/polymethylvinylether copolymers (MVA), terpolymers of tetrafluoroethylene, polymethylvinylether and fluoroalkylvinylether (TFE/PMVE/FAVE), ethylene tetrafluoroethylene (ETFE), and mixtures thereof.

Preferably, the fluorocarbon resin or resins may be selected from polytetrafluoroethylene (PTFE), tetrafluoroethylene/perfluoropropylvinylether copolymers (PFA), tetrafluoroethylene/hexafluoropropylene copolymers (FEP), a mixture of PTFE and PFA (PTFE/PFA), and a mixture of PTFE and FEP (PTFE/FEP).

The binder resin or resins may advantageously be selected from polyamide-imides (PAI), polyetherimides (PEI), polyimides (PI), polyether ketones (PEK), polyether ether ketones (PEEK), polyethersulfones (PES), polyphenylene sulfides (PPS), and mixtures thereof.

The present invention also pertains to an item comprising a support comprising two opposite faces, at least one of the opposite faces of the support being coated with the coating as defined above.

Advantageously, the support of the item could be made of plastic, a metal material, glass, ceramic or terracotta. Among the metal supports that can be used in the context of the present invention, particular note may be made of supports made of aluminum or aluminum alloy, anodized or non-anodized, polished, brushed or bead-blasted, sanded, or chemically treated aluminum or aluminum alloy, or polished, brushed or bead-blasted stainless steel, or cast iron or cast aluminum, or titanium or hammered or polished copper.

Advantageously, the item is a culinary item, one of the support surfaces of which comprises a concave interior surface intended to come into contact with foods placed inside said item, and the other support surface of the item is a convex exterior surface intended to come into contact with a heat source.

Among the non-limiting examples of culinary items according to the present invention, particular note may be made of culinary items such as casseroles, frying pans, woks, saut pans, crepe pans, grills, Dutch ovens, kettles, pots, roasters, baking forms, and barbeque grills.

The item according to the present invention may be a household electrical appliance items. Among the household electrical appliance items that can be used in the context of the present invention, particular note may be made of deep fryer vats, pots for fondue or raclette, deep fryer or bread machine compartments, blender "bowls," smoothing iron plates or clothing iron soleplates.

The present invention also pertains to a method of manufacturing an item as described above, comprising the following steps:

i. provision of a support;
ii. application, onto at least one of the opposite surfaces of said support, of at least one layer of the coating composition as defined above; then
iii. curing of the entirety at a temperature ranging between 150° C. and 430° C.

The present invention also pertains to another method of manufacturing an item as described above, comprising the following steps:

i. provision of a support;
ii. application, onto at least one of the opposite surfaces of said support, of at least one layer of the anti-adhesive coating composition as defined above, and possibly at least one layer of the coating composition as defined above; then
iii. curing of the entirety at a temperature ranging between 350° C. and 430° C. Advantageously, this method of manufacturing may further comprise, between the application ii) and curing iii) steps, the application, onto said coating composition layer or anti-adhesive coating composition layer, of at least one layer of a composition comprising at least one fluorocarbon resin, possibly mixed with a thermostable binding resin resistant to temperatures greater than 200° C.

Advantageously, this method of manufacturing may further comprise, between the provision i) and application ii) steps, the application, onto said support surface, of at least one layer of a composition comprising at least one fluorocarbon resin, possibly mixed with a thermostable binder resin resistant to temperatures greater than 200° C.

The application of various compositions may be achieved using any appropriate technique known to individuals of ordinary skill in the art, for example spraying or screen printing.

In the case that multiple layers must be applied, a drying step may be carried out between each application to allow solvents and water to evaporate from the last layer applied. Advantageously, this trying step makes it possible to reduce, or even eliminate, the generation of defects (bubbles, cracks, etc.) in the coating during the subsequent curing step.

In the case that multiple layers must be applied and/or a drying step is carried out between each application, a cooling step may optionally be carried out between the drying step for the last layer applied and the application of the next layer. Advantageously, this cooling step makes it possible to avoid drying the new layer too quickly and a powdering phenomenon.

Other advantages and particularities of the present invention will become apparent in the following description, provided as a non-limiting example, and in reference to the annexed figures and corresponding examples.

The various embodiments depicted in FIGS. 1a through 4 are described in the examples below.

EXAMPLES

Tests

Evaluating the Adhesion of a Coating on a Surface

A cross-cut test was conducted in accordance with the standard NF T 30-038 (standard NF EN ISO 2049), followed by the immersion of the coated surface in three environments, consisting of three alternating cycles of: three hours in boiling water followed by three hours in oil at 200° C., followed by a two hour and forty minute dishwasher cycle with detergent. Then, after scoring the surface into a grid of 10×10=100 squares over 1 $cm^2$ using a fine razor blade, the anti-adhesive coating of each square was evaluated for the appearance of scratching or peeling. The rating is determined as detailed in the table below.

| Rating | Description |
| --- | --- |
| 0 | The edges of the cuts are completely smooth: none of the squares of the cross-cut area are detached. |
| 1 | Detachment of small flakes of the coating at the intersections of the cuts, affecting approximately 5% of the cross-cut area. |
| 2 | The coating has flaked along the edges or at the intersections of the cuts, and the detached surface represents significantly more than 5%, and up to approximately 15% of the cross-cut area. |
| 3 | The coating has flaked along the edges of the cuts either partially or fully in large ribbons, or has flaked partially or fully in various parts of the cross-cut areas. The detached surface represents significantly more than 15%, and up to approximately 35% of the cross-cut area. |
| 4 | The coating has flaked along the edges of the cuts in large ribbons or some squares have detached partially or fully. The detached surface represents significantly more than 35%, and up to 65% of the cross-cut area. |
| 5 | Any degree of flaking beyond the classification criteria set forth for rating 4. |

Test of the Hydrophobicity of a Coating

The hydrophobic characteristics of a coating are evaluated by measuring the contact angle of a drop of water on the coating using a GBX Digidrop goniometer.

Measurement of the Thickness of a Coating

Coating thickness is measured using a coating thickness measurement device, such as the device sold by the company Fischer Instruments under the name PERMASCOPE®.

Three measurements were made in nine different areas of the coating and the average was calculated.

Examples Produced

Example 1—Preparation of a Coating Composition SF1

A coating composition based on condensed tannins derived from mimosa, SF1, is prepared, the composition of which is detailed in the following table.

| | SF1 (mass in g) | % wet | % dry |
| --- | --- | --- | --- |
| Condensed tannin derived from mimosa, powdered form | 30.0 | 12.41 | 65.7 |
| $NH_4OH$ (at 10.25% in water) | 180.0 | 74.44 | — |
| Glycerol | 1.8 | 0.74 | — |
| Triethyl phosphate (TEP) (at 52.2% dry extract) | 30.0 | 12.41 | 34.3 |
| TOTAL | 241.8 | 100.0 | 100.0 |

The coating composition SF1 is prepared at ambient temperature by:
  obtaining a homogenous mixture comprising ammonia and additives (glycerol and TEP) by mixing with a shear disperser;
  adding tannin powder, while mixing, to obtain a homogenous mixture.

The characteristics of the resulting SF1 composition are measured:
viscosity: 33 s in the 2.5 mm AFNOR viscosity flow cup. (CA 2.5)
pH: 11.3

Example 2—Preparation of a Coating Composition SF2

A coating composition based on condensed tannins derived from quebracho, SF2, is prepared, the composition of which is detailed in the following table.

|  | SF2 (mass in g) | % wet | % dry |
| --- | --- | --- | --- |
| Condensed tannin derived from quebracho, powdered form | 10.0 | 5.89 | 50.25 |
| $NH_4OH$ (at 10.25% in water) | 40.0 | 23.54 | — |
| Glycerol | 7.0 | 4.12 | — |
| Furfuryl alcohol (FA) | 9.9 | 5.83 | 49.75 |
| Demineralized water | 103.0 | 60.62 | — |
| TOTAL | 170.0 | 100.00 | 100.00 |

The coating composition SF2 is prepared at ambient temperature by:
obtaining a homogenous mixture comprising ammonia and glycerol by mixing with a shearing blade disperser;
adding tannin powder, while continuing to mix;
adding FA, while continuing to mix; and finally homogenization of the coating composition via extended mixing.

The characteristics of the resulting SF2 composition are measured:
viscosity: 33 s in the 2.5 mm AFNOR viscosity flow cup. (CA 2.5)
pH: 6.4

Example 3—Preparation of an Anti-Adhesive Primer Layer Coating Composition P1

An anti-adhesive coating composition P1 based on the coating composition SF1 from Example 1 is prepared, the composition of which is detailed in the following table.

|  | P1 (wet mass in g) | % wet | % dry |
| --- | --- | --- | --- |
| Dispersion of PTFE (at 60% in water) | 26.0 | 17 | 39.5 |
| SF1 (at 18.9% dry extract) | 126.5 | 83 | 60.5 |
| TOTAL | 152.5 | 100 | 100.0 |

The anti-adhesive coating composition P1 is prepared at ambient temperature by:
mixing the dispersion of PTFE with SF1 with a (non-shearing) blade disperser to obtain a homogenous mixture.

The characteristics of the resulting P1 composition are measured:
viscosity: 43 s in the 2.5 mm AFNOR viscosity flow cup. (CA 2.5)
pH: 10-11

Example 4—Preparation of an Anti-Adhesive Primer Layer Coating Composition P2

An anti-adhesive coating composition P2 based on the coating composition SF1 from Example 1 is prepared, the composition of which is detailed in the following table.

|  | P1 (mass in g) | % wet | % dry |
| --- | --- | --- | --- |
| Dispersion of PTFE (at 60% in water) | 58.07 | 11.8 | 27.6 |
| Dispersion of PFA (at 50% in water) | 30.32 | 6.2 | 12.0 |
| SF1 (at 18.9% dry extract) | 403.23 | 82.0 | 60.4 |
| TOTAL | 491.62 | 100.0 | 100.0 |

The anti-adhesive coating composition P2 is prepared at ambient temperature by:
mixing the dispersion of PTFE and the dispersion of PFA with SF1 with a (non-shearing) blade disperser to obtain a homogenous mixture.

The characteristics of the resulting P2 composition are measured:
viscosity: 43 s in the 2.5 mm AFNOR viscosity flow cup. (CA 2.5)
pH: 10-11

Example 5—Preparation of an Anti-Adhesive Intermediate Layer Coating Composition M1

An anti-adhesive coating composition M1 based on the coating composition SF1 from Example 1 is prepared, the composition of which is detailed in the following table.

|  | M1 (mass in g) | % wet | % dry |
| --- | --- | --- | --- |
| Dispersion of PTFE (at 60% in water) | 232.28 | 52.4 | 64.23 |
| Dispersion of PFA (at 50% in water) | 121.20 | 27.3 | 27.93 |
| SF1 (at 18.9% dry extract) | 90.00 | 20.3 | 7.84 |
| TOTAL | 443.48 | 100.0 | 100.00 |

The anti-adhesive coating composition M1 is prepared at ambient temperature by:
mixing the dispersion of PTFE and the dispersion of PFA with SF1 with a (non-shearing) blade disperser to obtain a homogenous mixture.

The characteristics of the resulting M1 composition are measured:
viscosity: 53 s in the 2.5 mm AFNOR viscosity flow cup. (CA 2.5)
pH: 10-11

Example 6—Preparation of an Anti-Adhesive Finish Layer Coating Composition F1

An anti-adhesive coating composition F1 based on the coating composition SF2 from Example 2 is prepared, the composition of which is detailed in the following table.

|  | F1 (wet mass in g) | % wet | % dry | F1 (dry mass in g) |
| --- | --- | --- | --- | --- |
| Dispersion of PTFE (at 60% in water) | 84.94 | 88.78 | 97.6 | 50.96 |
| Propylene glycol (PG) | 1.52 | 1.59 | — | — |
| SF2 (at 11.7% dry extract) | 9.00 | 9.41 | 2.0 | 1.05 |
| Mica flakes | 0.21 | 0.22 | 0.4 | 0.21 |
| TOTAL | 95.67 | 100.00 | 100.0 | 52.22 |

The anti-adhesive coating composition F1 is prepared at ambient temperature by:
  mixing the dispersion of PTFE with the PG and SF2 with a (non-shearing) blade disperser to obtain a homogenous mixture; and then
  adding mica flakes, while continuing to mix, to obtain a homogenous mixture.

The characteristics of the resulting F1 composition are measured:
  viscosity: 45 s in the 2.5 mm AFNOR viscosity flow cup. (CA 2.5)
  pH: 9-11

Example 7—Preparation of an Anti-Adhesive Finish Layer Coating Composition F2

An anti-adhesive coating composition F2 based on the coating composition SF1 from Example 1 is prepared, the composition of which is detailed in the following table.

|  | F2 (wet mass in g) | % wet | % dry | F2 (dry mass in g) |
| --- | --- | --- | --- | --- |
| Dispersion of PTFE (at 60% in water) | 84.94 | 91.71 | 98.1 | 50.96 |
| SF1 (at 18.9% dry extract) | 4.00 | 4.32 | 1.5 | 0.76 |
| Mica flakes | 0.21 | 0.23 | 0.4 | 0.21 |
| Water | 3.46 | 3.74 | — | — |
| TOTAL | 92.61 | 100.00 | 100.00 | 51.93 |

The anti-adhesive coating composition F2 is prepared at ambient temperature by:
  mixing the dispersion of PTFE with SF1 with a (non-shearing) blade disperser to obtain a homogenous mixture;
  adding mica flakes, while continuing to mix, to obtain a homogenous mixture; and finally
  adding water, while continuing to mix, to obtain a homogenous mixture.

The characteristics of the resulting F2 composition are measured:
  viscosity: 45 s in the 2.5 mm AFNOR viscosity flow cup. (CA 2.5)
  pH: 9-11

Example 8—Preparation of a Support Comprising a Layer of Composition SF1

The coating composition SF1 from Example 1 is sprayed onto an aluminum support surface previously subjected to a surface treatment to ensure a clean surface conducive to the proper anchoring of the composition.

The drying of the film is carried out following this coating process at approximately 70-80° C. to set the composition on the surface.

Figure 1A:
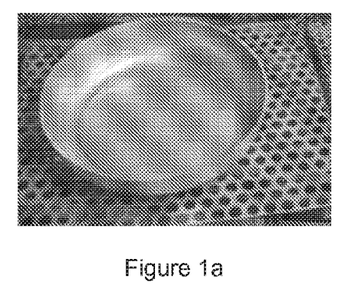
FIG. 1a depicts a photograph of an item, prior to curing, achieved according to a first embodiment of the present invention described in Example 7.

The resulting film, which is a glossy yellow ochre color, demonstrates the good coverage of the composition SF1, as depicted in FIG. 1a.

Figure 1B:
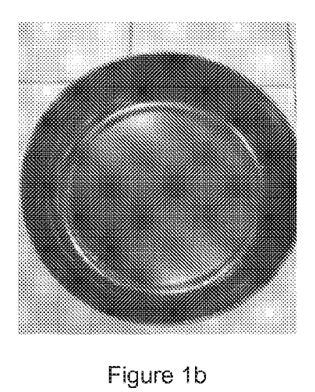
FIG. 1b depicts a photograph of the item illustrated in FIG. 1a after curing.

After curing at 430° C. for 11 minutes, the resulting uniform film appears smooth and has a glossy dark brown color as depicted in FIG. 1b.

The average thickness of the measured cured film is 6.4 µm.

The cured film exhibits very strong adhesion to the support: the adhesion test carried out on the surface coated with the cured film resulted in a rating of 0.

Example 9—Preparation of a Support Comprising a Layer of Composition P1

The anti-adhesive coating composition P1 is sprayed onto an aluminum support surface previously subjected to a surface treatment to ensure a clean surface conducive to the proper anchoring of the primer.

The drying of the film is carried out following this coating process at approximately 70-80° C. to set the composition on the surface.

Figure 2A:
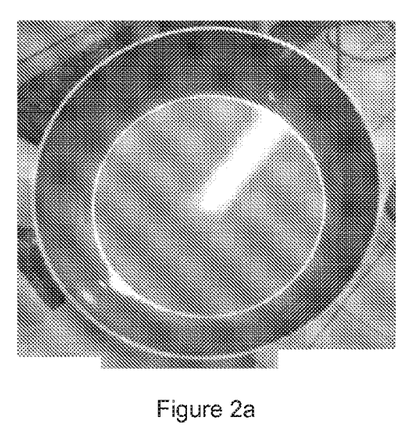
FIG. 2a depicts a photograph of an item, prior to curing, achieved according to a second embodiment of the present invention described in Example 8.

The resulting film, which is a glossy yellow ochre color, demonstrates the good coverage of the composition SF1, as depicted in FIG. 2a.

Figure 2B:
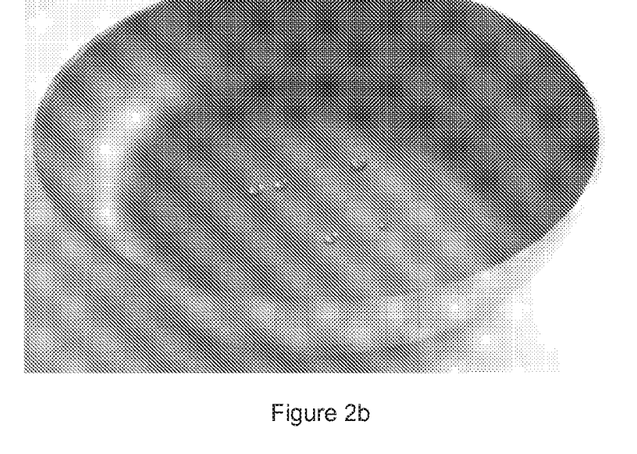
FIG. 2b depicts a photograph of the item depicted in FIG. 2a after curing.

After curing at 430° C. for 11 minutes, the resulting uniform film has a matte dark brown color as depicted in FIG. 2b.

The average thickness of the measured cured film is 6 µm.

The cured film exhibits very strong adhesion to the support: the adhesion test carried out on the surface coated with the cured film resulted in a rating of 0.

The cured film also exhibits very hydrophobic characteristics: the contact angle with a drop of water is greater than 100°.

Example 10—Preparation of a Support Comprising a Layer of Composition P1 and a Layer of Composition P2

The anti-adhesive coating composition P1 is sprayed onto an aluminum support surface previously subjected to a surface treatment to ensure a clean surface conducive to the proper anchoring of the primer.

The drying of the film is carried out following this coating process at approximately 70-80° C. to set the composition P1 on the surface. The support is then cooled to ambient temperature.

The anti-adhesive coating composition P2 is then sprayed onto the surface coated with the dried P1 composition.

The drying of the film is carried out following this coating process at approximately 70-80° C. to set the composition P2 on the film of composition P1.

Figure 3A:
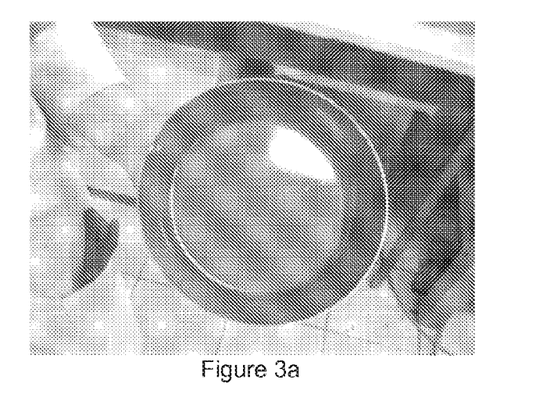
FIG. 3a depicts a photograph of an item, prior to curing, achieved according to a third embodiment of the present invention described in Example 9.

The resulting composite of films P1+P2, which is a glossy brown ochre color, demonstrates the good spreadability and coverage of compositions P1 and P2, as depicted in FIG. 3a.

Figure 3B:
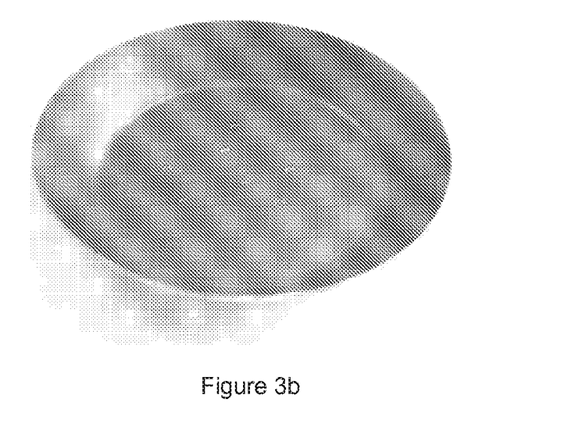
FIG. 3b depicts a photograph of the item depicted in FIG. 3a after curing.

After curing at 430° C. for 11 minutes, a uniform coating P1+P2 is obtained and has a matte dark brown color as depicted in FIG. 3b.

The average thickness of the measured coating is 10 µm.

The coating exhibits very strong adhesion to the support: the adhesion test carried out on the surface of the coating resulted in a rating of 0.

The coating also exhibits hydrophobic characteristics: the contact angle between the surface of the coating and a drop of water is greater than 120°.

Example 11—Preparation of a Support Comprising a Layer of Composition P1 and a Layer of Composition M1

The anti-adhesive coating composition P1 is sprayed onto an aluminum support surface previously subjected to a surface treatment to ensure a clean surface conducive to the proper anchoring of the primer.

The drying of the film is carried out following this coating process at approximately 70-80° C. to set the composition P1 on the surface. The support is then cooled to ambient temperature.

The anti-adhesive coating composition M1 is then sprayed onto the surface coated with the dried P1 composition.

The drying of the film is carried out following this coating process at approximately 70-80° C. to set the composition M1 on the film of composition P1.

The resulting composite of films P1+M1, which is a glossy brown ochre color, demonstrates the good spreadability and coverage of compositions P1 and M1.

After curing at 430° C. for 11 minutes, a uniform coating P1+M1 is obtained that is matte black in color.

The average thickness of the measured coating is 14 μm.

The coating exhibits very strong adhesion to the support: the adhesion test carried out on the surface coated with the coating resulted in a rating of 0.

The coating also exhibits hydrophobic characteristics: the contact angle between the surface of the coating and a drop of water is greater than 100°.

Example 12—Preparation of a Support Comprising a Layer of Composition P1 and a Layer of Composition P2 and a Layer of Composition F2

The anti-adhesive coating composition P1 is sprayed onto an aluminum support surface previously subjected to a surface treatment to ensure a clean surface conducive to the proper anchoring of the primer.

The drying of the film is carried out following this coating process at approximately 70-80° C. to set the composition P1 on the surface. The support is then cooled to ambient temperature.

The anti-adhesive coating composition P2 is then sprayed onto the surface coated with the dried P1 composition.

The drying of the film is carried out following this coating process at approximately 70-80° C. to set the composition P2 on the film of composition P1. The support is then cooled to ambient temperature.

The anti-adhesive coating composition F2 is then sprayed onto the surface coated with the dried composite of films P1+P2.

The drying of the film is carried out following this coating process at approximately 70-80° C. to set the composition F2 on the composite of films P1+P2.

Figure 4:
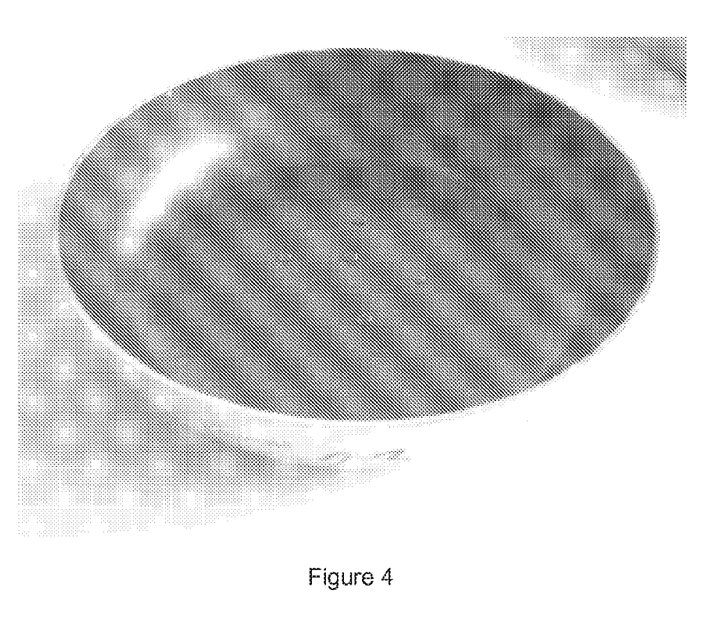
FIG. 4 depicts a photograph of an item, after curing, achieved according to a fourth embodiment of the present invention described in Example 10.

After curing at 430° C. for 11 minutes, a uniform coating P1+P2+F2 is obtained that is a glossy, speckled dark brown as depicted in FIG. 4.

The average thickness of the measured coating is 23 μm.

The coating exhibits very strong adhesion to the support: the adhesion test carried out on the surface of the coating resulted in a rating of 0.

The coating also exhibits hydrophobic characteristics: the contact angle between the surface of the coating and a drop of water is greater than 100°.

The coating also exhibits anti-adhesive characteristics verified by multiple cycles of cooking a volume of 30 ml of milk on the surface of the coating until carbonization of the liquid occurs. The milk that carbonized on the surface is easily detached from the coating with no more than the pressure of a jet of cold water from the faucet.

Example 13—Preparation of a Support Comprising a Layer of Composition P1, a Layer of Composition M1 and a Layer of Composition F2

The anti-adhesive coating composition P1 is sprayed onto an aluminum support surface previously subjected to a surface treatment to ensure a clean surface conducive to the proper anchoring of the primer.

The drying of the film is carried out following this coating process at approximately 70-80° C. to set the composition P1 on the surface. The support is then cooled to ambient temperature.

The anti-adhesive coating composition M1 is then sprayed onto the surface coated with the dried P1 composition.

The drying of the film is carried out following this coating process at approximately 70-80° C. to set the composition M1 on the film of composition P1. The support is then cooled to ambient temperature.

The anti-adhesive coating composition F2 is then sprayed onto the surface coated with the dried composite of films P1+M1.

The drying of the film is carried out following this coating process at approximately 70-80° C. to set the composition F2 on the composite of films P1+M1.

After curing at 430° C. for 11 minutes, a uniform coating P1+M1+F2 is obtained that is a glossy, speckled dark brown as depicted in FIG. 4.

The average thickness of the measured coating is 27 μm.

The coating exhibits very strong adhesion to the support: the adhesion test carried out on the surface of the coating resulted in a rating of 0.

The coating also exhibits hydrophobic characteristics: the contact angle between the surface of the coating and a drop of water is greater than 100°.

The coating also exhibits anti-adhesive characteristics verified by multiple cycles of cooking a volume of 30 ml of milk on the surface of the coating until carbonization of the liquid occurs. The milk that carbonized on the surface is easily detached from the coating with no more than the pressure of a jet of cold water from the faucet.

Example 14—Preparation of a Support Comprising a Layer of Composition P1 and a Layer of Composition F1

The anti-adhesive coating composition P1 is sprayed onto an aluminum support surface previously subjected to a surface treatment to ensure a clean surface conducive to the proper anchoring of the primer.

The drying of the film is carried out following this coating process at approximately 70-80° C. to set the composition P1 on the surface. The support is then cooled to ambient temperature.

The anti-adhesive coating composition F1 is then sprayed onto the surface coated with the dried P1 composition.

The drying of the film is carried out following this coating process at approximately 70-80° C. to set the composition F1 on the film of composition P1.

After curing at 430° C. for 11 minutes, a uniform coating P1+F1 is obtained that is a matte dark brown color.

The average thickness of the measured coating is 18 μm.

The coating exhibits very strong adhesion to the support: the adhesion test carried out on the surface of the coating resulted in a rating of 0.

The coating also exhibits hydrophobic characteristics: the contact angle between the surface of the coating and a drop of water is greater than 100°.

Comparative Example 1—Preparation of a Coating Composition SFC

|  | SFC (wet mass in g) | % wet | SFC (dry mass in g) |
|---|---|---|---|
| PAI resin (30% in NEP) | 325.0 | 32.50 | 97.5 |
| NMP | 78.3 | 7.83 | — |
| NEP | 76.8 | 7.68 | — |
| Triethylamine | 23.6 | 2.36 | — |
| Diethylethanolamine | 8.9 | 0.89 | — |
| Demineralized water | 487.4 | 48.74 | — |
| Total | 1000.0 | 100.00 | 97.5 |

The coating composition SFC is prepared at ambient temperature by:
  obtaining a homogenous mixture comprising PAI resin, solvents and amines by mixing with a shearing blade disperser;
  adding demineralized water, while continuing to mix to obtain a homogenous mixture; and finally
  grinding the mixture for one hour and thirty minutes.

The viscosity of the resulting composition SFC is measured:
  viscosity: 10-15 s in the 4 mm AFNOR viscosity flow cup. (C.A. 4)

Comparative Example 2—Preparation of an Anti-Adhesive Primer Layer Coating Composition PC1

An anti-adhesive coating composition PC1 based on the coating composition SFC1 from Comparative Example 1 is prepared, the composition of which is detailed in the following table.

|  | PC1 (wet mass in g) | PC1 (dry mass in g) | % wet |
|---|---|---|---|
| SFC (at 9.75% dry extract) | 145.9 | 14.22 | 50 |
| Dispersion of PTFE (at 60% in water) | 23.7 | 14.22 | 50 |
| Total | 169.6 | 28.44 | 100 |

The anti-adhesive coating composition PC1 is prepared at ambient temperature by:
  mixing the PTFE dispersion with SFC using a (non-shearing) blade disperser to obtain a homogenous mixture.

The viscosity of the resulting composition PC1 is measured:
  viscosity: 50-60 s in the 2.5 mm AFNOR viscosity flow cup. (C.A. 2.5)

Comparative Example 3—Preparation of an Anti-Adhesive Primer Layer Coating Composition PC2

An anti-adhesive coating composition PC2 based on the coating composition SFC1 from Comparative Example 1 is prepared, the composition of which is detailed in the following table.

|  | PC2 (wet mass in g) | PC2 (dry mass in g) | % wet |
|---|---|---|---|
| SFC (at 9.75% dry extract) | 328.0 | 32.0 | 50 |
| Dispersion of PTFE (at 60% in water) | 37.5 | 22.5 | 35.2 |
| Dispersion of PFA (at 50% in water) | 19.0 | 9.5 | 14.8 |
| Total | 384.5 | 64.0 | 100.0 |

The anti-adhesive coating composition PC2 is prepared at ambient temperature by:
  mixing the dispersions of PTFE and PFA with SFC using a (non-shearing) blade disperser to obtain a homogenous mixture.

The viscosity of the resulting composition PC2 is measured:
  viscosity: 40-50 s in the 2.5 mm AFNOR viscosity flow cup. (C.A. 2.5)

Comparative Example 4—Preparation of Support Comprising a Layer of Composition PC1

The anti-adhesive coating composition PC1 is sprayed onto an aluminum support surface previously subjected to a surface treatment to ensure a clean surface conducive to the proper anchoring of the primer.

The drying of the film is carried out following this coating process at approximately 70-80° C. to set the composition on the surface.

After curing at 430° C. for 11 minutes, a uniform coating is obtained of an average measured thickness of 5 μm.

The cured film exhibits very strong adhesion to the support: the adhesion test carried out on the surface coated with the cured film resulted in a rating of 0.

The cured film also exhibits hydrophobic characteristics: the contact angle with a drop of water is greater than 100°

Comparative Example 5—Preparation of Support Comprising a Layer of Composition PC1 and a Layer of Composition PC2

The anti-adhesive coating composition PC1 is sprayed onto an aluminum support surface previously subjected to a surface treatment to ensure a clean surface conducive to the proper anchoring of the primer.

The drying of the film is carried out following this coating process at approximately 70-80° C. to set the composition PC1 on the surface. The support is then cooled to ambient temperature.

The anti-adhesive coating composition PC2 is then sprayed onto the surface coated with the dried PC1 composition.

The drying of the film is carried out following this coating process at approximately 70-80° C. to set the composition PC2 on the film of composition PC1.

After curing at 430° C. for 11 minutes, a uniform coating P1+P2 is obtained of an average measured thickness of 11 µm.

The coating exhibits very strong adhesion to the support: the adhesion test carried out on the surface of the coating resulted in a rating of 0.

The coating also exhibits sufficiently hydrophobic characteristics: the contact angle between the surface of the coating and a drop of water is greater than 90°.

The invention claimed is:

1. A coating composition comprising at least one condensed tannin and water, having a pH greater than 7, wherein the coating composition further comprises a polymerization agent selected from the group consisting of phosphate derivatives, furfuryl alcohol, glyoxal, and mixtures thereof.

2. The coating composition according to claim 1, wherein the mass percent of water is between 50% and 95% relative to the total mass of water and condensed tannin.

3. The coating composition according to claim 1, wherein the condensed tannin has, as a base structure, one or more flavan-3-ol monomer and/or flavan-3,4-diol monomer units and/or phlorotannins.

4. The coating composition according to claim 1, wherein the condensed tannin has, as a base structure, one or more monomer units corresponding to the following formula:

in which
the carbons in position 6, 8, 2' and 6' are substituted by a hydrogen,
the carbons in position 4, 5, 3' and 5' are independently substituted by a hydroxyl group or by a hydrogen.

5. The coating composition according to claim 1, wherein the condensed tannin is biosourced or synthetic.

6. The coating composition according to claim 1, wherein the pH is between 8 and 13.

7. An anti-adhesive coating composition comprising a coating composition and at least one fluorocarbon resin, wherein the coating composition comprises at least one condensed tannin, a polymerization agent, and water and has a pH greater than 7, and wherein the polymerization agent is selected from the group consisting of phosphate derivatives, furfuryl alcohol, glyoxal, and mixtures thereof.

8. The anti-adhesive coating composition according to claim 7, wherein the fluorocarbon resin is selected from polytetrafluoroethylene (PTFE), tetrafluoroethylene/perfluoropropylvinylether copolymers (PFA), tetrafluoroethylene/hexafluoropropylene copolymers (FEP), polyvinylidene fluoride (PVDF), tetrafluoroethylene/polymethylvinylether copolymers (MVA), terpolymers of tetrafluoroethylene, polymethylvinylether and fluoroalkylvinylether (TFE/PMVE/FAVE), ethylene tetrafluoroethylene (ETFE), and mixtures thereof.

9. The anti-adhesive coating composition according to claim 7, wherein the fluorocarbon resin represents 10% to 99% by weight of the total dry weight of the anti-adhesive coating composition.

10. The anti-adhesive coating composition according to claim 7, wherein the condensed tannin has, as a base structure, one or more flavan-3-ol monomer and/or flavan-3,4-diol monomer units and/or phlorotannins.

11. The anti-adhesive coating composition according to claim 7, wherein the condensed tannin has, as a base structure, one or more monomer units corresponding to the following formula:

in which
the carbons in position 6, 8, 2', and 6' are substituted by a hydrogen,
the carbons in position 4, 5, 3', and 5' are independently substituted by a hydroxyl group or by a hydrogen.

12. The anti-adhesive coating composition according to claim 7, wherein the condensed tannin is biosourced or synthetic.

* * * * *